US011362320B2

(12) United States Patent
Tochio et al.

(10) Patent No.: US 11,362,320 B2
(45) Date of Patent: Jun. 14, 2022

(54) POSITIVE ELECTRODE ACTIVE MATERIAL FOR NONAQUEOUS ELECTROLYTE SECONDARY BATTERIES, METHOD FOR PRODUCING POSITIVE ELECTRODE ACTIVE MATERIALS FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventors: Takaya Tochio, Osaka (JP); Takeshi Ogasawara, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 194 days.

(21) Appl. No.: 16/630,917

(22) PCT Filed: Jul. 10, 2018

(86) PCT No.: PCT/JP2018/025966
§ 371 (c)(1),
(2) Date: Jan. 14, 2020

(87) PCT Pub. No.: WO2019/021806
PCT Pub. Date: Jan. 31, 2019

(65) Prior Publication Data
US 2020/0235377 A1    Jul. 23, 2020

(30) Foreign Application Priority Data
Jul. 27, 2017   (JP) .............................. JP2017-145472

(51) Int. Cl.
*H01M 4/131* (2010.01)
*H01M 4/04* (2006.01)
(Continued)

(52) U.S. Cl.
CPC .......... *H01M 4/131* (2013.01); *H01M 4/0471* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 2003/0124424 A1 | 7/2003 | Takahashi et al. |
| 2009/0272940 A1 | 11/2009 | Kikuya et al. |

(Continued)

FOREIGN PATENT DOCUMENTS

| CN | 101595581 A | 12/2009 |
| CN | 102077397 A | 5/2011 |

(Continued)

OTHER PUBLICATIONS

Translation of International Search Report dated Oct. 16, 2018, issued in counterpart Application No. PCT/JP2018/025966. (2 pages).

(Continued)

*Primary Examiner* — Wyatt P McConnell
(74) *Attorney, Agent, or Firm* — WHDA, LLP (57) ABSTRACT

A positive electrode active material which predominantly includes lithium transition metal composite oxide particles containing Ni and Al, and which has a low charge transfer resistance and thus allows the battery capacity to be increased. The composite oxide particles contain 5 mol % or more Al relative to the total molar amount of metal elements except Li, include a particle core portion and an Al rich region on or near the surface of the composite oxide particle wherein the Al concentration in the particle core portion is not less than 3 mol % and the Al concentration in the Al rich region is 1.3 times or more greater than the Al concentration in the particle core portion. The composite oxide particles (Continued)

contain 0.04 mol % or more sulfate ions relative to the total molar amount of the particles.

7 Claims, 2 Drawing Sheets

(51) Int. Cl.
  *H01M 10/0525* (2010.01)
  *H01M 4/02* (2006.01)

(56) References Cited

U.S. PATENT DOCUMENTS

| | | | |
|---|---|---|---|
| 2011/0033750 A1* | 2/2011 | Hosokawa | H01M 4/131 |
| | | | 429/223 |
| 2016/0336593 A1* | 11/2016 | Honda | H01M 4/386 |
| 2018/0047977 A1 | 2/2018 | Furuichi et al. | |
| 2018/0215629 A1* | 8/2018 | Honma | H01M 10/052 |

FOREIGN PATENT DOCUMENTS

| | | |
|---|---|---|
| JP | H09-245787 A | 9/1997 |
| JP | 2001-266876 A | 9/2001 |
| JP | 2010-70431 A | 4/2010 |
| JP | 2010211925 A | 9/2010 |
| WO | 2016/140207 A1 | 9/2016 |

OTHER PUBLICATIONS

English Translation of Search Report dated Feb. 7, 2022, issued in counterpart CN Application No. 201880038205.5. (2 pages).

\* cited by examiner

POSITIVE ELECTRODE ACTIVE MATERIAL FOR NONAQUEOUS ELECTROLYTE SECONDARY BATTERIES, METHOD FOR PRODUCING POSITIVE ELECTRODE ACTIVE MATERIALS FOR NONAQUEOUS ELECTROLYTE SECONDARY BATTERIES, AND NONAQUEOUS ELECTROLYTE SECONDARY BATTERY

TECHNICAL FIELD

The present disclosure relates to a positive electrode active material for nonaqueous electrolyte secondary batteries, to a method for producing positive electrode active materials for nonaqueous electrolyte secondary batteries, and to a nonaqueous electrolyte secondary battery.

BACKGROUND ART

Lithium transition metal composite oxide particles are constituents of positive electrode active materials for nonaqueous electrolyte secondary batteries. Such particles are synthesized by mixing a lithium compound and a transition metal oxide and calcining the mixture. For example, Patent Literatures 1 and 2 disclose methods for producing a positive electrode active material in which a nickel-containing hydroxide, an aluminum compound such as aluminum hydroxide, and lithium hydroxide are mixed together and calcined.

CITATION LIST

Patent Literature

PTL 1: Japanese Published Unexamined Patent Application No. 2010-70431
PTL 2: Japanese Published Unexamined Patent Application No. 2001-266876

SUMMARY OF INVENTION

Unfortunately, the conventional positive electrode active materials such as those disclosed in Patent Literatures 1 and 2 have a problem in that the aluminum compound causes an increase in charge transfer resistance and consequently the initial discharge capacity is lowered. An object of the present disclosure is to provide a positive electrode active material which predominantly includes lithium transition metal composite oxide particles containing Ni and Al, and which has a low charge transfer resistance and thus allows the battery capacity to be increased.

A positive electrode active material for nonaqueous electrolyte secondary batteries according to the present disclosure predominantly includes lithium transition metal composite oxide particles containing Ni and Al, wherein the lithium transition metal composite oxide particles contain 5 mol % or more Al relative to the total molar amount of metal elements except Li, include a particle core portion and an Al rich region on or near the surface of the particle wherein the Al concentration in the particle core portion is not less than 3 mol % and the Al concentration in the Al rich region is 1.3 times or more greater than the Al concentration in the particle core portion, and contain 0.04 mol % or more sulfate ions relative to the total molar amount of the particles.

A method of the present disclosure for producing positive electrode active materials for nonaqueous electrolyte secondary batteries includes a step of mixing a transition metal composite oxide containing Ni and Al, a lithium compound, aluminum hydroxide and aluminum sulfate to one another to form a mixture, and a step of calcining the mixture, the molar mixing ratio of the aluminum hydroxide to the aluminum sulfate being 9:1 to 3:7.

A nonaqueous electrolyte secondary battery according to the present disclosure includes a positive electrode including the positive electrode active material described above, a negative electrode, and a nonaqueous electrolyte.

The positive electrode active material for nonaqueous electrolyte secondary batteries of the present disclosure predominantly includes lithium transition metal composite oxide particles containing Ni and Al, and has a low charge transfer resistance and thus allows the battery capacity to be increased.

DESCRIPTION OF EMBODIMENTS

Characteristics such as heat resistance may be effectively enhanced by forming an Al rich layer having a higher Al concentration on or near the surface of lithium transition metal composite oxide particles. Studies by the present inventors have revealed that the Al rich layer gives rise to an increase in charge transfer resistance and decreases the initial discharge capacity. To solve this problem, the present inventors carried out extensive studies and have found that the charge transfer resistance may be specifically reduced and the initial discharge capacity of a battery may be significantly enhanced by using lithium transition metal composite oxide particles which have a particle core portion and, on or near the particle surface, an Al rich region having an Al concentration 1.3 times or more greater than that in the particle core portion and which contain a specific amount of sulfate ions.

Lithium transition metal composite oxide particles, which constitute a positive electrode active material in one aspect of the present disclosure, may be synthesized by mixing a transition metal composite oxide containing Ni and Al, a lithium compound, aluminum hydroxide and aluminum sulfate to one another in a specific ratio, and calcining the resultant mixture.

Hereinbelow, an example embodiment will be described in detail. The following will illustrate a cylindrical battery in which a wound electrode assembly 14 is accommodated in a cylindrical battery case. However, the structure of the electrode assembly is not limited to such a coil, and may be a stack of a plurality of positive electrodes and a plurality of negative electrodes stacked alternately on top of one another via separators. The shape of the battery case is not limited to cylindrical, and may be, for example, a metallic case such as a prismatic case (a prismatic battery) or a coin shape (a coin-shaped battery), or a resin case (a laminate battery) made of resin films.

Figure 1:
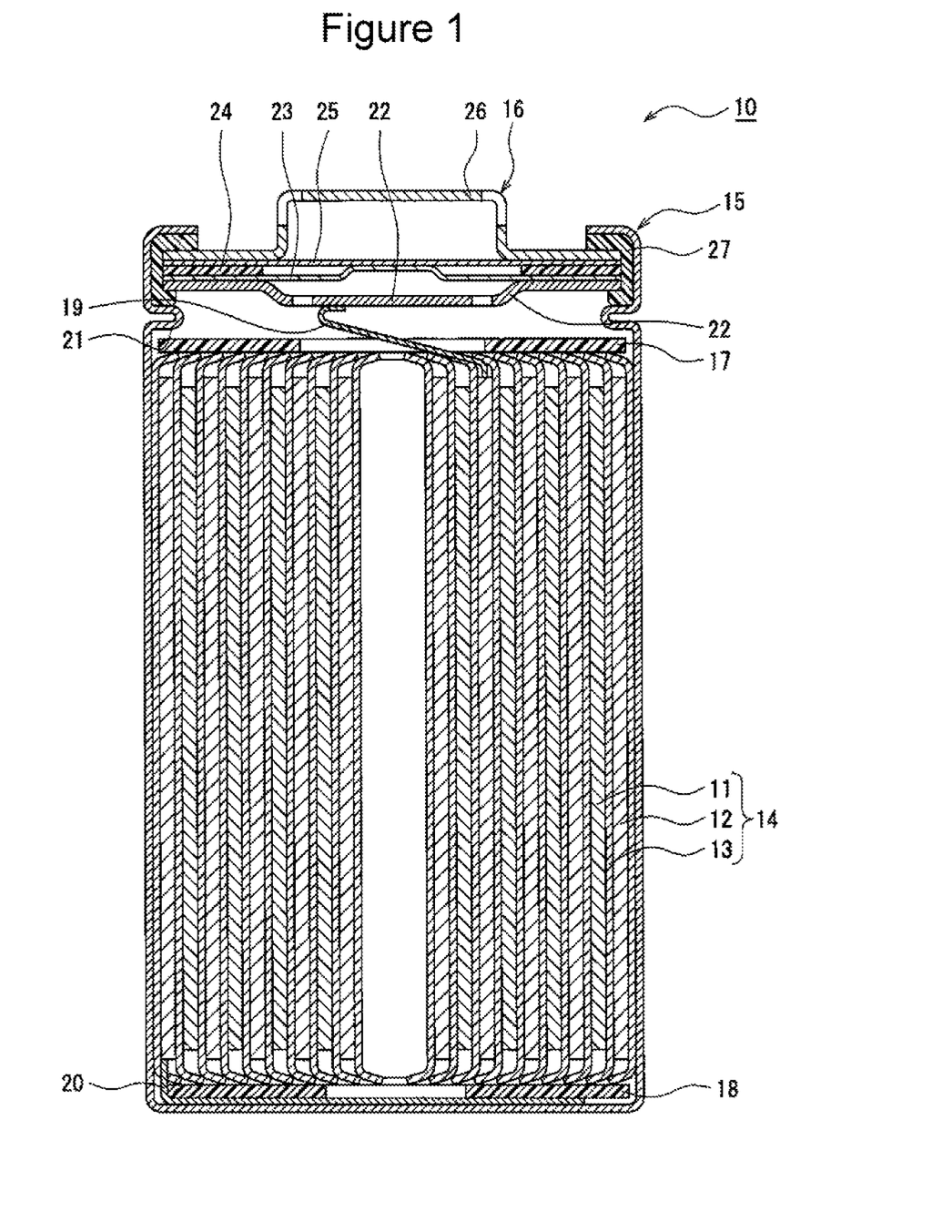
FIG. 1 is a sectional view of a nonaqueous electrolyte secondary battery according to an example embodiment.

FIG. 1 is a sectional view of a nonaqueous electrolyte secondary battery 10 according to an example embodiment. As illustrated in FIG. 1, the nonaqueous electrolyte secondary battery 10 includes an electrode assembly 14, a nonaqueous electrolyte (not shown), and a battery case in which the electrode assembly 14 and the nonaqueous electrolyte are accommodated. The electrode assembly 14 has a wound structure that is formed of a positive electrode 11 and a negative electrode 12 wound together via a separator 13. The battery case is composed of a bottomed cylindrical case body 15, and a seal body 16 which seals the opening of the case body.

The nonaqueous electrolyte secondary battery 10 includes insulating plates 17, 18 disposed on and under the electrode assembly 14, respectively. In the example illustrated in FIG. 1, a positive electrode lead 19 attached to the positive electrode 11 extends toward the seal body 16 through a through-hole in the insulating plate 17, and a negative electrode lead 20 attached to the negative electrode 12 extends along the outside of the insulating plate 18 to the bottom of the case body 15. The positive electrode lead 19 is connected by welding or the like to the lower side of a filter 22 that is a bottom plate of the seal body 16. Thus, a cap 26 that is a top plate of the seal body 16 and is electrically connected to the filter 22 serves as a positive electrode terminal. The negative electrode lead 20 is connected by welding or the like to the inner side of the bottom of the case body 15, thus allowing the case body 15 to serve as a negative electrode terminal.

For example, the case body 15 is a bottomed cylindrical metallic case. A gasket 27 is disposed between the case body 15 and the seal body 16, thus offering tightness in the inside of the battery case. The case body 15 has a flange portion 21 which is formed by, for example, pressing a lateral outside portion and which supports the seal body 16. Preferably, the flange portion 21 is an annular portion which extends along the circumference of the case body 15 and supports the seal body 16 on the upper side thereof.

The seal body 16 has a structure in which the filter 22, a lower valve 23, an insulating member 24, an upper valve 25 and the cap 26 are stacked in this order from the side adjacent to the electrode assembly 14. For example, the members constituting the seal body 16 have a disk shape or a ring shape, and the members except the insulating member 24 are electrically connected to one another. The lower valve 23 and the upper valve 25 are connected to each other in the respective central portions, and the insulating member 24 is interposed between peripheral portions of the valves. The lower valve 23 has a vent hole. In the event that the inner pressure of the battery is increased by abnormal heat generation, the upper valve 25 is swollen toward the cap 26 and is separated from the lower valve 23 to interrupt the electrical connection between the two valves. If the inner pressure is further increased, the upper valve 25 is ruptured and allows the gas to be discharged through the opening in the cap 26.

Hereinbelow, the constituent elements of the nonaqueous electrolyte secondary battery 10 will be described in detail, with particular emphasis placed on a positive electrode active material.

[Positive Electrodes]

The positive electrode includes a positive electrode current collector and a positive electrode mixture layer disposed on the positive electrode current collector. The positive electrode current collector may be, for example, a foil of a metal that is stable at the positive electrode potentials, such as aluminum, or a film having such a metal as a skin layer. The positive electrode mixture layer includes a positive electrode active material, a conductive agent and a binder. For example, the positive electrode may be fabricated by applying a positive electrode mixture slurry including components such as a positive electrode active material, a conductive agent and a binder onto the positive electrode current collector, drying the wet films, and rolling the coatings to form positive electrode mixture layers on both sides of the current collector.

Examples of the conductive agents contained in the positive electrode mixture layers include carbon materials such as carbon black, acetylene black, Ketjen black and graphite. Examples of the binders include fluororesins such as polytetrafluoroethylene (PTFE) and polyvinylidene fluoride (PVdF), polyolefins such as ethylene-propylene-isoprene copolymer and ethylene-propylene-butadiene copolymer, polyacrylonitriles (PAN), polyimides and acrylic resins. These resins may be used in combination with, for example, carboxymethylcellulose (CMC) or a salt thereof, and polyethylene oxide (PEO). These materials may be used singly, or two or more may be used in combination.

The weight ratio of the positive electrode active material to the binder is preferably 100:1 to 100:0.4. The weight ratio of the positive electrode active material to the conductive agent is preferably in the range of 100:1.3 to 100:0.5.

Figure 2:
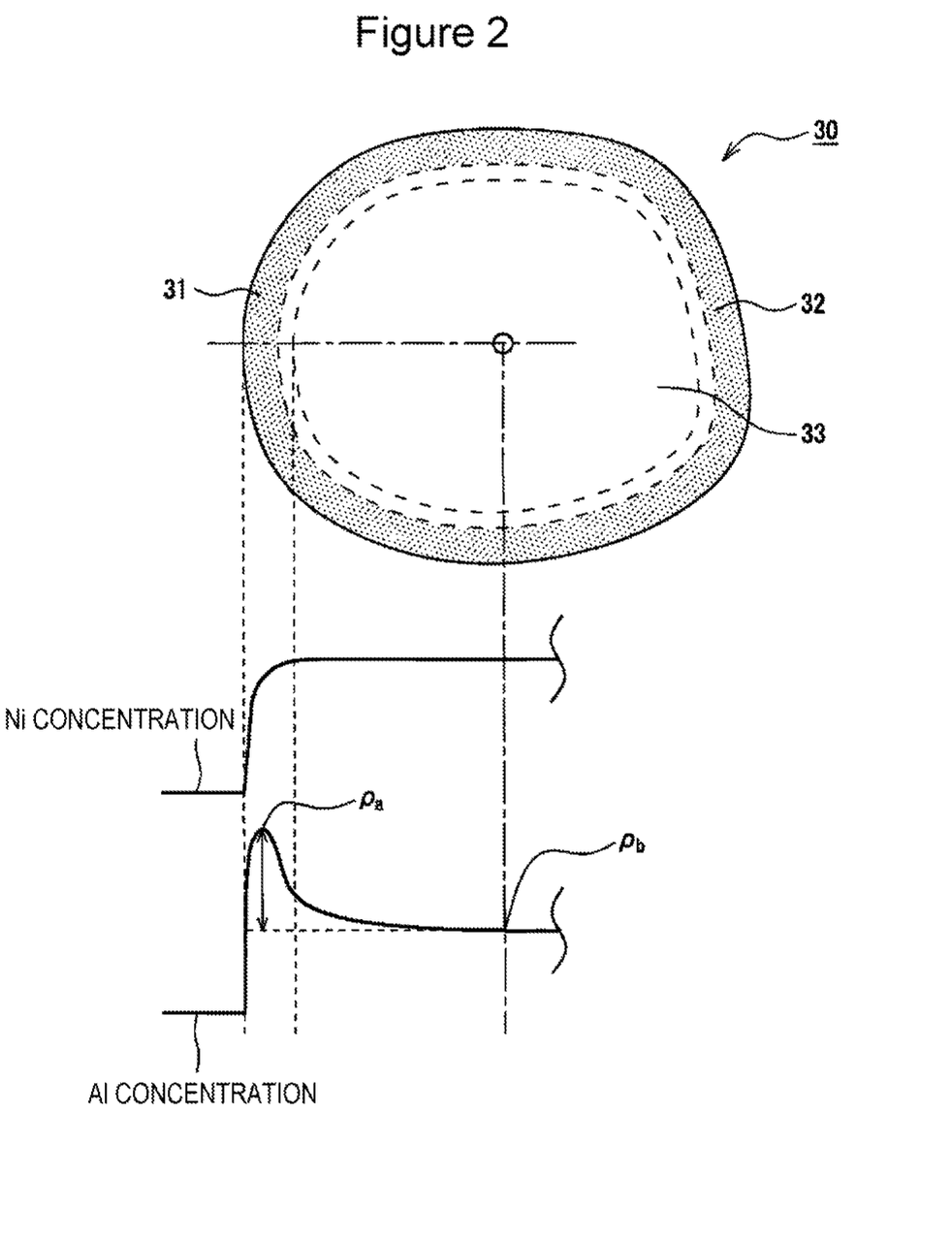
FIG. 2 is a set of a sectional view of a lithium transition metal composite oxide particle which constitutes a positive electrode active material according to an example embodiment, and a diagram showing the distributions of the Ni and Al concentrations in the illustrated cross section of the particle.

FIG. 2 is a set of a sectional view of a lithium transition metal composite oxide particle 30 (hereinafter, "composite oxide particle 30") which constitutes a positive electrode active material according to an example embodiment, and a diagram showing the distributions of the Ni and Al concentrations in the illustrated cross section of the particle. The positive electrode active material predominantly includes the composite oxide particles 30 containing Ni and Al. Here, the term "predominantly" means that the particles represent the largest weight proportion among the components constituting the positive electrode active material. For example, the positive electrode active material may include, in addition to the composite oxide particles 30, components such as a lanthanoid compound attached to the surface of the particles. The positive electrode active material may exclusively include the composite oxide particles 30 alone. The present embodiment will illustrate the positive electrode active material as exclusively including the composite oxide particles 30.

For example, the average particle size of the composite oxide particles 30 is 2 to 30 μm, and preferably 5 to 15 μm. The composite oxide particles 30 may be secondary particles formed of a large number of primary particles aggregated to one another. The average particle size of the composite oxide particles 30 is the median diameter (D50) measured by a laser diffraction method, and may be determined with, for example, a laser diffraction scattering grain size distribution analyzer manufactured by HORIBA, Ltd.

The composite oxide particles 30 contain Ni, Al and Li, and further contain, for example, at least one metal element selected from Co, Mn, Mg, Ca, Sc, Ti, V, Cr, Fe, Cu, Zn, Ga, Ge, Y, Zr, Sn, Sb, Pb and Bi. In particular, the particles preferably contain at least one of Co and Mn, and particularly preferably contain Co. A preferred example of the composite oxide particles 30 is a composite oxide containing Li, Ni, Co and Al.

The composite oxide particles 30 preferably contain Ni in a proportion of not less than 80 mol %, and more preferably not less than 85 mol % relative to the total molar amount of the metal elements except Li. When the Ni content is 80 mol % or above, the battery that is obtained attains a higher capacity. A preferred example of the composite oxide particles 30 is composed of a composite oxide represented by the compositional formula $Li_xNi_aM_{(1-a-b)}Al_bO_2$ (wherein $0.95 \leq x \leq 1.2$, $0.80 \leq a < 0.95$, $0.05 < b$, and M is at least one of Co and Mn, and is preferably Co).

The composite oxide particles 30 contain Al in a proportion of not less than 5 mol % relative to the total molar amount of the metal elements except Li, and have an Al concentration of not less than 3 mol % as measured with respect to a particle core portion. Further, the composite oxide particles 30 have an Al rich region 31 on or near the surface of the particle in which the Al concentration is 1.3 times or more greater than the Al concentration in the particle core portion. The composite oxide particles 30 contain 0.04 mol % or more sulfate ions relative to the total molar amount of the particles. By virtue of the use of the composite oxide particles 30 satisfying these conditions, the charge transfer resistance in the positive electrode is specifically reduced, and the initial discharge capacity of the battery is significantly enhanced.

In the composite oxide particles 30, the Al concentration differs between a superficial region 32 including the particle surface and the vicinity thereof, and a particle core region 33 that is found more central of the particle than the superficial region 32. On the other hand, the Ni concentration is substantially constant throughout, for example, the entirety of the composite oxide particles 30. The Al concentration is higher in the superficial region 32 than in the particle core region 33, and is not less than 5 mol % as an average in the entire particle. If the Al concentration of the composite oxide particles 30 is less than 5 mol %, for example, heat resistance is not sufficiently enhanced. The concentrations of the metal elements such as Al in the entirety of the composite oxide particles 30 may be measured with an ICP emission spectrometer.

The Al rich region 31 has a higher aluminum content than the other regions. As already mentioned, this region has an Al concentration that is 1.3 times or more greater than the Al concentration in the particle core portion. The Al rich region may be identified by measuring Al in a cross section of the particle using an energy-dispersive X-ray spectrometer (EDX). Here, the particle core portion is defined by drawing tangent lines on the periphery of the particle, and drawing lines from the tangent points toward the inside of the particle perpendicularly to the tangent lines so as to determine the intersection of all the lines with the same lengths. The Al rich region 31 resides in the superficial region 32. Specifically, it is preferable that the Al rich region reside in an area which extends from the surface of the composite oxide particle 30 to a depth of 2 μm.

As mentioned above, the Al rich region 31 may reside in an area which extends from the surface of the composite oxide particle 30 to a depth of 2 μm toward the particle core. The Al rich region may reside in the entirety of this area, or may represent a portion of the area. Generally, a portion of the area extending from the surface of the composite oxide particle 30 to a depth of 2 μm will define an Al rich region 31 having an Al concentration that is 1.3 times or more greater than the Al concentration in the particle core portion. For example, the Al rich region 31 may extend from the surface of the composite oxide particle 30 to a depth of 1.5 μm, or to a depth of 1 μm. The size of the Al rich region 31 generally varies depending on the particle size of the composite oxide particle 30. For example, the Al rich region 31 resides in an area that extends from the surface of the composite oxide particle 30 to a depth corresponding to 20% or less of the circumscribed circle diameter of the particle.

The maximum value ($\rho a$) of the Al concentration in the Al rich region 31 is, for example, 1.3 to 5 times, and preferably 1.7 to 3 times greater than the Al concentration ($\rho b$) in the particle core portion. For example, $\rho b$ may be 3 to 5 mol %, and $\rho a$ may be 5 to 15 mol %. The Al concentration may change sharply at the predetermined depth (for example, 2 μm) from the surface of the composite oxide particle 30, or may gradually decrease from the surface to the core of the particle. For example, the Al concentration in the particle core portion and the vicinity thereof is substantially constant. From points of view such as capacity increase, the upper limit of the Al content in the composite oxide particles 30 is preferably 10 mol % or less relative to the total molar amount of the metal elements except Li.

As mentioned earlier, the composite oxide particles 30 contain 0.04 mol % or more sulfate ions relative to the total molar amount of the particles. When the content of sulfate ions is 0.04 mol % or more, the superficial region 32 containing much Al is probably modified and the charge transfer resistance is specifically reduced as a result. The content of sulfate ions is preferably 0.04 to 0.24 mol %, and more preferably 0.04 to 0.12 mol % relative to the total molar amount of the particles. In the present embodiment, the sulfate ions in the particles are derived from aluminum sulfate that is an ingredient of the composite oxide particles 30.

The sulfate ions may be distributed substantially uniformly over the entirety of the composite oxide particles 30 or may be abundant in the superficial region 32 similarly to Al. For example, the composite oxide particles 30 may have a sulfate ion rich region which resides in an area extending from the surface of the particle to a depth of 2 μm and which has a higher concentration of sulfate ions than the particle core portion. The concentration of sulfate ions may be measured by ion chromatography.

The steps for the production of the composite oxide particles 30 include a step of mixing a transition metal composite oxide containing Ni and Al, a lithium compound, aluminum hydroxide ($Al(OH)_3$) and aluminum sulfate ($Al_2(SO_4)_3$) to one another to form a mixture, and a step of calcining the mixture. Here, the molar mixing ratio of the aluminum hydroxide to the aluminum sulfate is controlled to 9:1 to 3:7. For example, the molar ratio of the aluminum hydroxide to the aluminum sulfate may be controlled to 8:2 to 4:6, or 8:2 to 5:5.

The aluminum hydroxide and the aluminum sulfate may be mixed together before they are mixed with the other materials. When the two kinds of Al compounds (aluminum hydroxide and aluminum sulfate) are added as a mixture in the specific molar ratio, the charge transfer resistance of the positive electrode is specifically reduced and the initial discharge capacity of the battery is significantly enhanced while still taking advantage of the addition of the Al compounds. The Al compounds that are added may include an additional compound other than aluminum hydroxide and aluminum sulfate, but preferably consist substantially of the above two kinds of compounds alone.

Examples of the transition metal composite oxides include those composite oxides containing, in addition to Ni and Al, at least one of Co and Mn, or preferably Co. Examples of the lithium compounds include lithium hydroxide, lithium carbonate and lithium nitrate. The transition metal composite oxide, the lithium compound, and the Al compounds including aluminum hydroxide and aluminum sulfate are preferably mixed in a molar ratio of 1:1:0.01 to 1:1.05:0.1.

The calcination of the mixture is performed in an oxygen atmosphere at a temperature in the range of 500 to 900° C. The calcination temperature is more preferably 600 to 850° C., and particularly preferably 700 to 800° C. By setting the calcination temperature in this range, the composite oxide particles 30 that are produced attain the aforementioned composition and properties.

[Negative Electrodes]

The negative electrode includes a negative electrode current collector and a negative electrode mixture layer disposed on the current collector. The negative electrode current collector may be, for example, a foil of a metal that is stable at the negative electrode potentials, such as copper, or a film having such a metal as a skin layer. The negative electrode mixture layer includes a negative electrode active material and a binder. For example, the negative electrode may be fabricated by applying a negative electrode mixture slurry including components such as a negative electrode active material and a binder onto the negative electrode current collector, drying the wet films, and pressing the coatings to form negative electrode mixture layers on both sides of the current collector.

The negative electrode active material is not particularly limited as long as it can reversibly store and release lithium ions. Examples thereof include carbon materials such as natural graphite and artificial graphite, metals which can be alloyed with Li such as silicon (Si) and tin (Sn), and oxides containing such metals as Si and Sn. The negative electrode active materials may be used singly, or two or more may be used in combination.

Examples of the binders include fluororesins, PAN, polyimides, acrylic resins and polyolefins, similarly to the case of the positive electrodes. When the mixture slurry is prepared using an aqueous solvent, for example, CMC or a salt thereof, styrene-butadiene rubber (SBR), polyacrylic acid (PAA) or a salt thereof, or polyvinyl alcohol may be preferably used.

[Separators]

The separator may be a porous sheet having ion permeability and insulating properties. Specific examples of the porous sheets include microporous thin films, woven fabrics and nonwoven fabrics. Some preferred separator materials are olefin resins such as polyethylene and polypropylene, and celluloses. The separator may be a monolayer structure or a stack structure.

[Nonaqueous Electrolytes]

The nonaqueous electrolyte includes a nonaqueous solvent and an electrolyte salt dissolved in the nonaqueous solvent. Examples of the nonaqueous solvents include esters, ethers, nitriles such as acetonitrile, amides such as dimethylformamide, and mixtures of two or more kinds of these solvents. The nonaqueous solvent may be a halogenated solvent resulting from the substitution of the above solvent with a halogen atom such as fluorine in place of at least part of hydrogen. The nonaqueous electrolyte is not limited to a liquid electrolyte (a nonaqueous electrolytic solution), and may be a solid electrolyte such as a gel polymer.

Examples of the esters include cyclic carbonate esters such as ethylene carbonate (EC), propylene carbonate (PC) and butylene carbonate, chain carbonate esters such as dimethyl carbonate (DMC), methyl ethyl carbonate (MEC), diethyl carbonate (DEC), methyl propyl carbonate, ethyl propyl carbonate and methyl isopropyl carbonate, cyclic carboxylate esters such as γ-butyrolactone (GBL) and γ-valerolactone (GVL), and chain carboxylate esters such as methyl acetate, ethyl acetate, propyl acetate, methyl propionate (MP) and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether.

Some preferred examples of the halogenated solvents are fluorinated cyclic carbonate esters such as fluoroethylene carbonate (FEC), fluorinated chain carbonate esters, and fluorinated chain carboxylate esters such as methyl fluoropropionate (FMP).

The electrolyte salt is preferably a lithium salt. Examples of the lithium salts include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (1<x<6, and n is 1 or 2), $LiB_{10}Cl_{10}$, LiCl, LiBr, LiI, chloroborane lithium, lithium lower aliphatic carboxylates, borate salts such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {l and m are integers of 1 or greater}. The lithium salts may be used singly, or a plurality thereof may be used as a mixture. From points of view such as ion conductivity and electrochemical stability, $LiPF_6$ is preferably used. The concentration of the lithium salt is preferably 0.8 to 1.8 mol per L of the nonaqueous solvent.

EXAMPLES

Hereinbelow, the present disclosure will be further described based on EXAMPLES. However, it should be construed that the scope of the present disclosure is not limited to such EXAMPLES.

Example 1

[Synthesis of Positive Electrode Active Material]

Nickel cobalt aluminum composite oxide represented by $Ni_{0.93}Co_{0.035}Al_{0.035}O_2$, lithium hydroxide (LiOH), aluminum hydroxide $(Al(OH)_3)$ and aluminum sulfate $(Al_2(SO_4)_3)$ were mixed together in a molar ratio of 1:1:0.018:0.002. The molar mixing ratio of aluminum hydroxide to aluminum sulfate was 9:1. Next, the mixture was calcined under a stream of oxygen at 700° C. for 20 hours. Lithium transition metal composite oxide particles (a positive electrode active material) were thus obtained.

The composite oxide particles (the positive electrode active material) were analyzed with an ICP emission spectrometer, and the composition of the particles was determined to be $Li_1Ni_{0.91}Co_{0.035}Al_{0.055}O_2$. A cross section of the particle was analyzed with an energy-dispersive X-ray spectrometer (EDX). The Al concentration near the surface of the particle was determined to be 1.5 times the Al concentration in the particle core portion. Further, the Al concentration in the particle core portion was 3.5 mol % relative to the total molar amount of the metal elements except Li. The concentration of sulfate ions in the composite oxide particles was determined by ion chromatography to be 0.04 mol % relative to the total molar amount of the particles.

[Fabrication of Positive Electrode]

The positive electrode active material, acetylene black and polyvinylidene fluoride were mixed together in a mass ratio of 100:0.75:0.6. An appropriate amount of N-methyl-2-pyrrolidone (NMP) was added to adjust the viscosity. A positive electrode mixture slurry was thus prepared. Next, the slurry was applied to both sides of an aluminum foil as a positive electrode current collector. The wet films were dried. Thereafter, the coated current collector was compressed with a roller and was cut to a predetermined electrode size. A positive electrode was thus obtained which had positive electrode mixture layers on both sides of the positive electrode current collector.

[Preparation of Nonaqueous Electrolyte]

Ethylene carbonate (EC), methyl ethyl carbonate (MEC) and dimethyl carbonate (DMC) were mixed together in a volume ratio of 20:5:75. $LiPF_6$ was dissolved with a concentration of 1.2 mol/L into the above mixed solvent. A nonaqueous electrolyte was thus prepared.

[Fabrication of Test Cell]

The positive electrode and a negative electrode composed of a lithium metal foil were opposed to each other and were stacked via a separator, and the stack was wound to form an electrode assembly. Next, the electrode assembly and the nonaqueous electrolyte were inserted into a coin-shaped aluminum exterior case. A test cell was thus obtained.

The test cell was tested to measure the initial discharge capacity and the reaction resistance. The evaluation results are described in Table 1. (The same applies to other EXAMPLES and COMPARATIVE EXAMPLES described later.)

[Measurement of Initial Discharge Capacity]

At a temperature of 25° C., the test cell was charged at a constant current of 0.7 mA until the cell voltage reached 4.2 V, and was thereafter charged at a constant voltage of 4.2 V until the current value became 0.07 mA. Subsequently, the test cell was discharged at a constant current of 0.7 mA to a cell voltage of 2.5 V, thereby determining the initial discharge capacity. The initial discharge capacity of the test cell was 213 mAh/g.

[Measurement of Reaction Resistance]

With an AC impedance analyzer (SI1287 Electrochemical Interface manufactured by Solatron), AC impedances at 20 kHz to 0.01 Hz were measured. Based on the measurement data, Cole-Cole plots were drawn. The reaction resistance was determined based on the size of the arc between 10 Hz and 0.1 Hz.

Example 2

A positive electrode active material and a test cell were obtained in the same manner as in EXAMPLE 1, except that the mixing ratio of aluminum hydroxide to aluminum sulfate in the synthesis of the positive electrode active material was changed to 7:3.

Example 3

A positive electrode active material and a test cell were obtained in the same manner as in EXAMPLE 1, except that the mixing ratio of aluminum hydroxide to aluminum sulfate in the synthesis of the positive electrode active material was changed to 3:7.

Example 4

A positive electrode active material and a test cell were obtained in the same manner as in EXAMPLE 1, except that the synthesis of the positive electrode active material involved mixing of nickel cobalt aluminum composite oxide represented by $Ni_{0.93}Co_{0.035}Al_{0.035}O_2$, lithium hydroxide, aluminum hydroxide and aluminum sulfate in a molar ratio of 1:1:0.036:0.004. The composition of the positive electrode active material was $Li_1Ni_{0.89}Co_{0.035}Al_{0.075}O_2$.

Example 5

A positive electrode active material and a test cell were obtained in the same manner as in EXAMPLE 4, except that the mixing ratio of aluminum hydroxide to aluminum sulfate in the synthesis of the positive electrode active material was changed to 7:3.

Example 6

A positive electrode active material and a test cell were obtained in the same manner as in EXAMPLE 4, except that the mixing ratio of aluminum hydroxide to aluminum sulfate in the synthesis of the positive electrode active material was changed to 3:7.

Comparative Example 1

A positive electrode active material and a test cell were obtained in the same manner as in EXAMPLE 1, except that the nickel cobalt aluminum composite oxide used in the synthesis of the positive electrode active material was replaced by one represented by $Ni_{0.91}Co_{0.045}Al_{0.035}O_2$, and that aluminum sulfate was not added. The composition of the positive electrode active material was $Li_1Ni_{0.91}Co_{0.045}Al_{0.045}O_2$.

Comparative Example 2

A positive electrode active material and a test cell were obtained in the same manner as in EXAMPLE 1, except that the nickel cobalt aluminum composite oxide used in the synthesis of the positive electrode active material was replaced by one represented by $Ni_{0.91}Co_{0.045}Al_{0.035}O_2$, and that the amounts of aluminum hydroxide and aluminum sulfate were halved. The composition of the positive electrode active material was $Li_1Ni_{0.91}Co_{0.045}Al_{0.045}O_2$.

Comparative Example 3

A positive electrode active material and a test cell were obtained in the same manner as in EXAMPLE 1, except that the aluminum sulfate used in the synthesis of the positive electrode active material was replaced by aluminum hydroxide (the amount of aluminum hydroxide was doubled).

Comparative Example 4

A positive electrode active material and a test cell were obtained in the same manner as in EXAMPLE 1, except that the aluminum hydroxide used in the synthesis of the positive electrode active material was replaced by aluminum sulfate (the amount of aluminum sulfate was doubled).

Comparative Example 5

A positive electrode active material and a test cell were obtained in the same manner as in EXAMPLE 4, except that the aluminum sulfate used in the synthesis of the positive electrode active material was replaced by aluminum hydroxide (the amount of aluminum hydroxide was doubled).

Comparative Example 6

A positive electrode active material and a test cell were obtained in the same manner as in EXAMPLE 4, except that the aluminum hydroxide used in the synthesis of the positive electrode active material was replaced by aluminum sulfate (the amount of aluminum sulfate was doubled).

TABLE 1

| | Composite oxide | | | Al compound Mixing ratio*1 | | Core Al cconcentration (mol %) | Superficial Al concentration*2 (times) | Sulfate ions (mol %) | Initial discharge capacity (mAh/g) | Reaction resistance (Ω) |
|---|---|---|---|---|---|---|---|---|---|---|
| | Ni | Co | Al | (mol %) | | | | | | |
| COMP. EX. 1 | 91 | 4.5 | 4.5 | 1.0 | 10:0 | 4.5 | 1 | 0.02 | 217 | 34 |
| COMP. EX. 2 | 91 | 4.5 | 4.5 | 1.0 | 7:3 | 4.5 | 1 | 0.02 | 217 | 34 |
| EX. 1 | 91 | 3.5 | 5.5 | 2.0 | 9:1 | — | — | 0.04 | 213 | 25 |
| EX. 2 | 91 | 3.5 | 5.5 | 2.0 | 7:3 | 3.5 | 1.8 | 0.06 | 215 | 23 |
| EX. 3 | 91 | 3.5 | 5.5 | 2.0 | 3:7 | — | — | 0.12 | 212 | 26 |
| COMP. EX. 3 | 91 | 3.5 | 5.5 | 2.0 | 10:0 | 3.5 | 1.4 | 0.02 | 209 | 34 |
| COMP. EX. 4 | 91 | 3.5 | 5.5 | 2.0 | 0:10 | — | — | 0.17 | 203 | 36 |
| EX. 4 | 91 | 3.5 | 7.5 | 4.0 | 9:1 | — | — | 0.07 | 194 | 20 |
| EX. 5 | 89 | 3.5 | 7.5 | 4.0 | 7:3 | 3.5 | 2.9 | 0.11 | 203 | 17 |
| EX. 6 | 89 | 3.5 | 7.5 | 4.0 | 3:7 | — | — | 0.23 | 191 | 21 |
| COMP. EX. 5 | 89 | 3.5 | 7.5 | 4.0 | 10:0 | 3.5 | 2.1 | 0.02 | 187 | 44 |
| COMP. EX. 6 | 89 | 3.5 | 7.5 | 4.0 | 0:10 | — | — | 0.35 | 174 | 34 |

*1Aluminum hydroxide:Aluminum sulfate (by mol)
*2Maximum value of Al concentration in area extending from particle surface 2 μm depth/Al concentration in particle core portion As shown in Table 1, all the test cells of EXAMPLES attained lower reaction resistance (charge transfer resistance) and higher initial discharge capacity than the test cells of COMPARATIVE EXAMPLES. The test cells of EXAMPLES will exhibit good output characteristics on account of their low reaction resistance. The test cells of EXAMPLES involved aluminum hydroxide and aluminum sulfate as ingredients of the positive electrode active material. These test cells achieved a specific reduction in reaction resistance and a marked enhancement in initial discharge capacity as compared to the cells of COMPARATIVE EXAMPLES in which only either of the ingredients was used.

Incidentally, even the use of aluminum hydroxide and aluminum sulfate did not offer low reaction resistance when the Al content was less than 5 mol %.

REFERENCE SIGNS LIST

10 NONAQUEOUS ELECTROLYTE SECONDARY BATTERY
11 POSITIVE ELECTRODE
12 NEGATIVE ELECTRODE
13 SEPARATOR
14 ELECTRODE ASSEMBLY
15 CASE BODY
16 SEAL BODY
17, 18 INSULATING PLATES
19 POSITIVE ELECTRODE LEAD
20 NEGATIVE ELECTRODE LEAD
21 FLANGE PORTION
22 FILTER
23 LOWER VALVE
24 INSULATING MEMBER
25 UPPER VALVE
26 CAP
27 GASKET
30 LITHIUM TRANSITION METAL COMPOSITE OXIDE PARTICLE (COMPOSITE OXIDE PARTICLE)
31 Al RICH REGION
32 PARTICLE CORE REGION
33 SUPERFICIAL REGION

The invention claimed is:

1. A positive electrode active material for nonaqueous electrolyte secondary batteries comprising lithium transition metal composite oxide particles containing Ni and Al, said particles representing the largest weight proportion among components constituting the positive electrode active material, wherein
   the lithium transition metal composite oxide particles contain 5 mol % or more Al relative to the total molar amount of metal elements except Li,
   include a particle core portion, and an Al rich region that extends from a surface of the particle to a depth corresponding to 20% or less of a circumscribed circle diameter of the particle, wherein the Al concentration in the particle core portion is not less than 3 mol % relative to the total molar amount of metal elements except Li and the Al concentration in the Al rich region is 1.3 times or more greater than the Al concentration in the particle core portion, and
   contain 0.04 mol % or more sulfate ions relative to the total molar amount of lithium transition metal composite oxide in the lithium transition metal composite oxide particles.

2. The positive electrode active material according to claim 1, wherein the Al rich region resides in an area extending from the surface of the lithium transition metal composite oxide particles to a depth of 2 μm.

3. The positive electrode active material according to claim 1, wherein the lithium transition metal composite oxide particles contain at least one of Co and Mn.

4. The positive electrode active material according to claim 1, wherein the lithium transition metal composite oxide particles contain Ni in a proportion of not less than 80 mol % relative to the total molar amount of the metal elements except Li.

5. A nonaqueous electrolyte secondary battery comprising: a positive electrode comprising the positive electrode active material described in claim 1, a negative electrode, and a nonaqueous electrolyte.

6. A method for producing positive electrode active materials for nonaqueous electrolyte secondary batteries, comprising:

a step of mixing a transition metal composite oxide containing Ni and Al, a lithium compound, aluminum hydroxide and aluminum sulfate to one another to form a mixture, and a step of calcining the mixture, the molar mixing ratio of the aluminum hydroxide to the aluminum sulfate being 9:1 to 3:7.

7. The method according to claim 6, wherein the calcination of the mixture is performed in an oxygen atmosphere at a temperature in the range of 500 to 900° C.

* * * * *